(12) United States Patent
Aoki

(10) Patent No.: US 7,431,761 B2
(45) Date of Patent: Oct. 7, 2008

(54) INK FOR INK JET RECORDING

(75) Inventor: Katsuko Aoki, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 226 days.

(21) Appl. No.: 11/241,816

(22) Filed: Sep. 30, 2005

(65) Prior Publication Data

US 2006/0075926 A1    Apr. 13, 2006

(30) Foreign Application Priority Data

Sep. 30, 2004    (JP) ............... 2004-287692

(51) Int. Cl.
  *C09D 11/02*    (2006.01)
(52) U.S. Cl. ................. 106/31.59; 106/31.89
(58) Field of Classification Search .............. 106/31.59, 106/31.89
  See application file for complete search history.

(56) References Cited

U.S. PATENT DOCUMENTS

| 4,957,553 | A | 9/1990 | Koike et al. | |
|---|---|---|---|---|
| 5,075,699 | A | 12/1991 | Koike et al. | |
| 5,395,434 | A * | 3/1995 | Tochihara et al. | 106/31.43 |
| 6,524,383 | B2 * | 2/2003 | Komatsu et al. | 106/493 |
| 2003/0076394 | A1 | 4/2003 | Gotoh et al. | |
| 2003/0101905 | A1 | 6/2003 | Momose | |
| 2003/0177945 | A1 | 9/2003 | Li et al. | |

FOREIGN PATENT DOCUMENTS

| EP | 0 769 536 | 4/1997 |
|---|---|---|
| EP | 1 010 802 | 6/2000 |
| EP | 1 020 499 A | 7/2000 |
| EP | 1 035 248 | 9/2000 |
| EP | 1 153 993 A | 11/2001 |
| EP | 1 174 436 | 1/2002 |
| JP | 63-139964 | 6/1988 |
| JP | 04-239068 | 8/1992 |
| JP | 09-111165 | 4/1997 |
| JP | 2000-327976 | 11/2000 |
| JP | 2001-146561 | 5/2001 |
| JP | 2002-30092 | 1/2002 |
| JP | 2002-283564 | 10/2002 |
| JP | 2002-309130 | 10/2002 |
| JP | 2004-043791 | 2/2004 |

OTHER PUBLICATIONS

Patents Abstracts of Japan of JP 04-239068 dated Aug. 26, 1992.
Patents Abstracts of Japan and JPO computer English translation of JP 2004-043791 dated Feb. 12, 2004.

* cited by examiner

*Primary Examiner*—Jerry Lorengo
*Assistant Examiner*—Veronica Faison Gee
(74) *Attorney, Agent, or Firm*—Ladas and Parry LLP

(57) ABSTRACT

Disclosed is an ink composition that, while improving print quality, advantageously has excellent ink ejection stability and does not significantly erode members such as a head and, at the same time, can meet a recent demand for highly skillful printing conditions, for example, high-speed printing with very small amounts of droplets. Ink jet recording is carried out using an ink composition comprising an acetylene glycol, an alcohol adduct of ethylene oxide and/or propylene oxide, and a pyrrolidone or its derivative in a specific composition.

15 Claims, No Drawings

INK FOR INK JET RECORDING

BACKGROUND OF THE INVENTION

1. Field of the Invention

The present invention relates to an ink composition suitable for use in ink jet recording, comprising an acetylene glycol, an alcohol adduct of ethylene oxide and/or propylene oxide, and a pyrrolidone or its derivative in a specific composition.

2. Background Art

Ink jet recording is a recording method which comprises ejecting ink as droplets toward a recording medium, regulating droplet trajectory direction and depositing the droplet onto the recording medium at its contemplated position. This method is advantageous, for example, in that a high-definition image can be recorded at a high speed in a quiet operation and color recording can easily be realized by using multicolor inks, and has been extensively used as recording means. In recent years, particularly for high-definition image record formation, the amount of ink droplet used in ink jet recording is very small, for example, about 10 pL. To this end, ink ejection holes (nozzles) of the recording head for ink ejection are formed very finely.

To ensure good print quality, a surfactant for providing penetration effect is added to the ink for ink jet recording. Nonionic surfactants are in many cases selected as the surfactant, because they can provide good record quality and a high level of effect of penetration into recording media. In particular, acetylene glycols have a very high level of penetration effect, and the claimed advantage of the acetylene glycols is excellent record quality in a small addition amount (for example, Japanese Patent Laid-Open Nos. 139964/1988 and 239068/1992).

This acetylene glycol has a high level of hydrophobicity and can offer penetration effect, but on the other hand, due to its low solubility in water, in some cases, care should be taken to avoid clogging of ink ejection holes and a deterioration in ejection stability. A proposal has been made on a method in which, in order to dissolve an acetylene glycol having low water solubility in ink, a surfactant or organic solvent, which is low in penetration but has high solubility, is added in combination with the acetylene glycol to the ink (for example, Japanese Patent Laid-Open No. 309130/2002).

However, the use of other surfactant or organic solvent as an aid in order to dissolve a large amount of the highly hydrophobic acetylene glycol into a water-based ink disadvantageously results in significantly lowered surface tension of the water-based ink. Further, the addition of a large amount of the surfactant or organic solvent often enhances attack of nozzles. When the surface tension of the ink is significantly lowered, the cohesive force of ink droplets is lowered and, consequently, the flying form of the ink droplet is likely to become unstable. The reduced amount of ink per droplet for high-definition record formation seeds small ejection energy necessary for ink ejection so that the flying form of the ink droplets becomes unstable. This further leads to a fear of causing a deterioration in record quality. Further, an enhancement in an attack on nozzles is critically undesirable since the very finely formed nozzle member is likely to cause deformation and the like by attack.

The present inventor has previously proposed an ink composition comprising a compound represented by formula (I) which will described later and a compound represented by formula (II) which will be described later (Japanese Patent Application No. 114357/2003). Advantageously, this ink has excellent ejection stability and is less likely to attack members such as a head while ensuring a high level of print quality. The specification in this proir application, however, does not disclose the weight ratio among the compound represented by formula (I), the compound represented by formula (II), and a pyrrolidone or its derivative, according to the present invention, in any part including working examples.

SUMMARY OF THE INVENTION

The present inventor has now found that an ink composition comprising an acetylene glycol, an alcohol adduct of ethylene oxide and/or propylene oxide, and a pyrrolidone or its derivative in a specific composition is advantageous in that, while further improving print quality, has excellent ink ejection stability and does not significantly attack members such as a head and, at the same time, can meet a recent demand for highly skillful printing conditions, for example, high-speed printing with very small amounts of droplets. The present invention has been made based on such finding.

Accordingly, an object of the present invention is to provide an ink composition that, while improving print quality, has excellent ink ejection stability and does not significantly attack members such as a head and, at the same time, can meet a recent demand for highly skillful printing conditions, for example, high-speed printing with very small amounts of droplets.

According to the present invention, there is provided an ink composition comprising a colorant, a compound represented by formula (I):

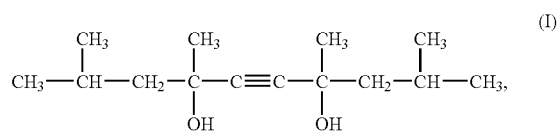

a compound represented by formula (II):

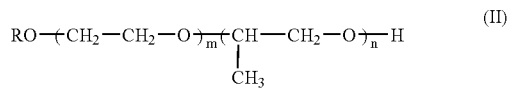

wherein

R represents a straight chain alkyl group having 1 to 20 carbon atoms, m is an integer of 6 to 18, and n is an integer of 0 to 5, a pyrrolidone or its derivative, and water, the compound represented by formula (I), the compound represented by formula (II), and the pyrrolidone or its derivative being contained in a weight ratio of compound represented by formula (I): compound represented by formula (II): pyrrolidone or its derivative of 1:0.3 to 0.7:40 to 80.

DETAILED DESCRIPTION OF THE INVENTION

The ink composition according to the present invention comprises at least a colorant, a compound represented by formula (I), a compound represented by formula (II), a pyrrolidone or its derivative, and water. The compound represented by formula (I), the compound represented by formula (II), and the pyrrolidone or its derivative are contained in a weight ratio of compound represented by formula (I): compound represented by formula (II): pyrrolidone or its derivative of 1:0.3 to 0.7:40 to 80, more preferably 1:0.4 to 0.7:55 to 75.

As described above, the present inventor has proposed, in the prior application, Japanese Patent Application No. 114357/2003, an ink composition comprising the compound represented by formula (I) and the compound represented by formula (II). The specification of this prior application describes, in Examples 1 and 2, an ink composition in which, in addition to the compounds represented by formulae (I) and (II), further, a pyrrolidone has been added to the ink. The weight ratio among the compound represented by formula (I), the compound represented by formula (II), and the pyrrolidone or its derivative in the ink compositions described in these working examples, however, does not fall within the above-defined weight ratio range in the present invention. The advantage of the ink compositions described in the specification of the prior application is that excellent ink ejection stability and no significant attack of members such as a head can be realized while ensuring high print quality.

The ink composition of the present invention is advantageous in that, since the weight ratio among the compound represented by formula (I), the compound represented by formula (II), and the pyrrolidone or its derivative fall within the above-defined range, the ink composition of the present invention can maintain or further improve the effect of the ink compositions described in the specification of the prior application and, at the same time, can meet a recent demand for highly skillful printing conditions, for example, high-speed printing with very small amounts of droplets. The ink composition of the present invention is particularly advantageous in that, even when the amount of ink per droplet is small, the flying form of ink droplet is stable. In the ink jet recording method, at the time of ejection of ink droplets, force for pushout in a direction of the front of the nozzle and force directed to the travel direction of the head are exerted. Therefore, the droplet reaches the surface of the recording medium in such a state that, regarding the leading part and tail part of the ink droplet, the tail part is deviated toward the travel direction of the head. The ejected ink droplet is generally in a columnar form. A shorter column means that the level of deviation is smaller. In this case, the ratio of the major axis to the minor axis of the dot is smaller, and the dot is truly round. Round dots can realize high-quality printing.

The ink composition according to the present invention, upon ejection of ink droplets, makes the ink droplet forms a short droplet column. In this case, advantageously, a near-truly round dot can be formed. Further, the ink composition according to the present invention is also advantageous in that, even when a higher frequency is applied to the head in its actuator for high-speed printing, the good print quality can be maintained.

In the present invention, the compound of formula (I) is the so-called "acetylene glycol" and is easily available, for example, from Air Products and Chemicals, Inc. under the tradename designation Surfynol 104.

In the present invention, the amount of the compound of formula (I) added is preferably in the range of 0.05 to 1.0% by weight. More preferably, the lower limit of the addition amount is about 0.07% by weight, and the upper limit of the addition amount is about 0.5% by weight.

The compound of formula (II) contained in the ink composition according to the present invention is an alcohol adduct of ethylene oxide and/or propylene oxide. In formula (II), R represents a straight-chain alkyl group having 1 to 20 carbon atoms, preferably a straight-chain alkyl group having 5 to 15 carbon atoms. m is an integer of 6 to 18, and n is an integer of 0 to 5, more preferably an integer of 1 to 4.

In the present invention, the amount of the compound of formula (II) added is preferably in the range of 0.02 to 0.7% by weight. More preferably, the lower limit of the addition amount is about 0.03% by weight, and the upper limit of the addition amount is about 0.35% by weight.

The pyrrolidone or its derivative contained in the ink composition according to the present invention is preferably 2-pyrrolidone or N-methyl-2-pyrrolidone. The content of the pyrrolidone or its derivative is preferably in the range of 2.0 to 50.0% by weight. More preferably, the lower limit of the addition amount is about 4.0% by weight, and the upper limit of the addition amount is about 38.0% by weight.

The main solvent of the ink composition according to the present invention is water, and pure water such as ion exchanged water or distilled water is preferred.

The colorant contained in the ink composition according to the present invention may contain any dye or pigment so far as it does not interact with the surfactant added to the water-based ink, and examples thereof include dyes such as direct dyes, acid dyes, basic dyes, reactive dyes, disperse dyes, and organic and inorganic pigments and foodstuff dyes. More specific examples thereof include C.I. Direct Red 2, C.I. Direct Red 4, C.I. Direct Red 9, C.I. Direct Red 23, C.I. Direct Red 26, C.I. Direct Red 31, C.I. Direct Red 62, C.I. Direct Red 72, C.I. Direct Red 84, C.I. Direct Red 95, C.I. Direct Red 225, C.I. Direct Red 233, C.I. Direct Red 242, and C.I. Direct Red 247, C.I. Direct Yellow 8, C.I. Direct Yellow 9, C.I. Direct Yellow 27, C.I. Direct Yellow 33, C.I. Direct Yellow 39, C.I. Direct Yellow 53, C.I. Direct Yellow 86, C.I. Direct Yellow 96, C.I. Direct Yellow 100, C.I. Direct Yellow 110, C.I. Direct Yellow 161, and C.I. Direct Yellow 163, C.I. Direct Blue 1, C.I. Direct Blue 15, C.I. Direct Blue 25, C.I. Direct Blue 68, C.I. Direct Blue 76, C.I. Direct Blue 80, C.I. Direct Blue 86, C.I. Direct Blue 87, C.I. Direct Blue 90, C.I. Direct Blue 106, C.I. Direct Blue 109, C.I. Direct Blue 158, C.I. Direct Blue 168, C.I. Direct Blue 194, C.I. Direct Blue 199, C.I. Direct Blue 211, C.I. Direct Blue 218, C.I. Direct Blue 236, C.I. Direct Blue 248, C.I. Direct Blue 252, and C.I. Direct Blue 270, C.I. Direct Black 19, C.I. Direct Black 154, and C.I. Direct Black 168, C.I. Acid Red 35, C.I. Acid Red 42, C.I. Acid Red 52, C.I. Acid Red 57, C.I. Acid Red 82, C.I. Acid Red 114, C.I. Acid Red 127, C.I. Acid Red 143, C.I. Acid Red 158, and C.I. Acid Red 261, C.I. Acid Yellow 17, C.I. Acid Yellow 23, C.I. Acid Yellow 39, C.I. Acid Yellow 44, C.I. Acid Yellow 76, and C.I. Acid Yellow 227, C.I. Acid Blue 9, C.I. Acid Blue 25, C.I. Acid Blue 41, C.I. Acid Blue 72, C.I. Acid Blue 78, C.I. Acid Blue 106, C.I. Acid Blue 120, and C.I. Acid Blue 138, and C.I. Acid Black 7, C.I. Acid Black 24, C.I. Acid Black 29, and C.I. Acid Black 48. Further, a dye solution prepared by dissolving a dye such as Special Black SP Liq. (manufactured by Bayer) in water may also be used.

The amount of the colorant added may be properly determined by taking into consideration, such as the type of the colorant, the type of the solvent component, and the properties required of the ink composition. Preferably, however, the amount of the colorant added is about 0.2 to 20% by weight, more preferably about 0.5 to 10% by weight, based on the total weight of the ink.

In the ink composition according to the present invention, in addition to the above ingredients, a wetting agent and a water soluble organic solvent may be added from the viewpoints of reliable ink ejection, storage stability, and the prevention of nozzle clogging caused by drying of the colorant. Specific examples of these additives which may be added to the ink include glycols such as ethylene glycol, diethylene glycol, triethylene glycol, propylene glycol, dipropylene glycol, and polyethylene glycol having a molecular weight of not more than 2000, glycerin and monoethers and monoesterification products thereof, nitrogen-containing compounds such as triethanolamine, and acetylene glycol surfactants. In the present invention, the above solvents may be added either solely or as a mixture of two or more of them. The amount of the solvent added is generally 1 to 50% by weight, preferably about 5 to 30% by weight.

If necessary, for example, viscosity modifiers, surface tension adjustors, pH adjustors, fungicides, and preservatives may be properly added.

The ink composition according to the present invention is characterized by making no significant attack on members, which come into contact with the ink, such as an ink head or an ink passage. By virtue of this property, the degree of freedom in printer design, that is, freedom in material selection can be advantageously enhanced. This is true of an ink vessel for storing the ink composition according to the present invention, and the degree of freedom in the design of members constituting the ink vessel, such as plastics, holding materials such as porous foams for holding the ink, and metal components such as springs constituting a mechanism for withdrawing the ink from the ink vessel can be enhanced. Specific examples of preferred plastics include polyethylene, polypropylene, and polystyrene, and specific examples of preferred porous foams include polyurethane and polyethylene, and specific examples of preferred metals include stainless steel.

The ink composition according to the present invention may be produced by dispersing and mixing the above ingredients together. In a preferred embodiment of the present invention, the ink composition according to the present invention is produced by the following production process. Specifically, at the outset, a solution of the compound represented by formula (I) dissolved in the compound represented by formula (II) is provided. Other ingredients, that is, the pyrrolidone or its derivative, water, and the colorant are added to the solution. Further, if necessary, a solution of the compound represented by formula (I) in a polyhydric alcohol is added to and mixed with the mixture for the production of the ink.

The compound represented by formula (I) is solid at room temperature and has low solubility in water. Therefore, when the compound represented by formula (I) as such is dissolved in water, there is a fear that a stable ink composition cannot be prepared. Therefore, preferably, the compound represented by formula (I) is first dissolved in the compound represented by formula (II), and the solution is mixed with other ingredients including water.

The compound represented by formula (I) and the compound represented by formula (II), when mixed together at a weight ratio of about 1:1 for dissolution, are most stable. Accordingly, in a preferred embodiment of the present invention, preferably, both the compounds are first mixed together at a weight ratio of 1:1, and the mixture is then mixed with other ingredients including water.

Further, when the amount of the compound represented by formula (I) added is still insufficient due to mixing of the compound represented by formula (I) and the compound represented by formula (II) together at a weight ratio of 1:1 or for other reasons, the compound represented by formula (I) may further be added later. Since the compound represented by formula (II) significantly attacks a certain type of materials for constituting the nozzles, in some cases, preferably, the amount of the compound represented by formula (II) added is limited. In such a case, in some cases, the limited amount of the compound represented by formula (II) added does not ensure the addition of a satisfactory amount of the compound represented by formula (I) to the ink composition. In this case, the compound represented by formula (I) may be added later.

In a preferred embodiment of the present invention, in the later addition, the compound represented by formula (I) is added after dissolution in a polyhydric alcohol. Preferred polyhydric alcohols include polyhydric alcohols having low volatility and relatively low viscosity, specifically propylene glycol, dipropylene glycol, and polyethylene glycol having a molecular weight of not more than 400.

EXAMPLES

The following Examples further illustrate the present invention but do not limit the present invention.

Solutions A and B used in the following Examples have a composition comprising a mixture of the following ingredients.

| Solution A | |
| --- | --- |
| Compound of formula (I) | 50 wt % |
| Compound of formula (II) | 50 wt % |
| A compound of formula (II) in which R represents C10, m is 12 on average, and n is 2 on average. | |
| Solution B | |
| Compound of formula (I) | 50 wt % |
| Propylene glycol | 50 wt % |

Example 1

| Special Black SP Liq. | 20.0 wt % |
| --- | --- |
| Glycerin | 11.0 wt % |
| Solution A | 0.15 wt % |
| Solution B | 0.10 wt % |
| 2-Pyrrolidone | 8.0 wt % |
| Surfynol 82* | 2.0 wt % |
| Preservative | 0.3 wt % |
| Ion exchanged water | 58.45 wt % |

The weight ratio of the compound of formula (I) to the compound of formula (II) to the pyrrolidone = 0.11:0.06:8.0 = 1:0.55:73.
*Surfynol 82 is an acetylene glycol surfactant represented by the following structural formula and is available from Air Products and Chemicals, Inc.

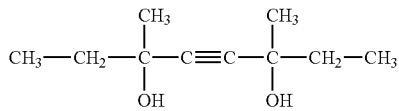

Example 2

| Special Black SP Liq. | 20.0 wt % |
| --- | --- |
| Glycerin | 13.5 wt % |
| Solution A | 0.18 wt % |
| Solution B | 0.08 wt % |
| N-Methyl-2-pyrrolidone | 6.0 wt % |
| Surfynol 82 | 2.0 wt % |
| Preservative | 0.3 wt % |
| Ion exchanged water | 57.94 wt % |

The weight ratio of the compound of formula (I) to the compound of formula (II) to the pyrrolidone = 0.11:0.07:6.0 = 1:0.64:55.

Example 3

| | | |
|---|---|---|
| C.I. Acid Red 52 | 4.5 | wt % |
| Glycerin | 15.0 | wt % |
| Solution A | 0.14 | wt % |
| Solution B | 0.16 | wt % |
| 2-Pyrrolidone | 8.0 | wt % |
| Surfynol 82 | 2.2 | wt % |
| Preservative | 0.3 | wt % |
| Ion exchanged water | 70.24 | wt % |

The weight ratio of the compound of formula (I) to the compound of formula (II) to the pyrrolidone = 0.14:0.06:8.0 = 1:0.43:57.

Example 4 (Comparative Example)

| | | |
|---|---|---|
| Special Black SP Liq. | 20.0 | wt % |
| Glycerin | 10.0 | wt % |
| Solution A | 0.10 | wt % |
| Solution B | 0.30 | wt % |
| 2-Pyrrolidone | 10.0 | wt % |
| Surfynol 82 | 1.6 | wt % |
| Preservative | 0.3 | wt % |
| Ion exchanged water | 57.70 | wt % |

The weight ratio of the compound of formula (I) to the compound of formula (II) to the pyrrolidone = 0.19:0.04:10.0 = 1:0.21:53.

Example 5 (Comparative Example)

| | | |
|---|---|---|
| C.I. Acid Red 52 | 4.5 | wt % |
| Glycerin | 13.0 | wt % |
| Solution A | 0.16 | wt % |
| Solution B | 0.12 | wt % |
| 2-Pyrrolidone | 10.0 | wt % |
| Surfynol 82 | 2.2 | wt % |
| Preservative | 0.3 | wt % |
| Ion exchanged water | 69.72 | wt % |

The weight ratio of the compound of formula (I) to the compound of formula (II) to the pyrrolidone = 0.12:0.06:10.0 = 1:0.5:83.

Ink Evaluation Test

Properties of the ink compositions prepared in Examples 1 to 5 were evaluated as follows.

(1) Length of Ink Droplet Column

Ink ejection means for evaluation in which a section between ink ejection face of the recording head and a position of 1.5 mm front from the ink ejection face can be observed at a time was prepared using an ink jet recording head and an ink feed mechanism for TM-J2100 (manufactured by Seiko Epson Corporation). The ink was ejected by the ink ejection means for evaluation, and the length of the ink droplet column at the time when the front end of the ink droplet reached a position of 1.5 mm front from the ink ejection face was measured. The ink was ejected under conditions of ink droplet weight 21 ng, ejection speed 7 m/sec, and head travel speed 1 m/sec. The length of the ink droplet column was evaluated according to the following criteria.
A: An ink column length of not more than 300 μm
B: An ink column length of more than 300 μm (2) Shape of Ink Droplet In observing the ink droplet column in the above item (1), the volume of the ink present between the leading end of the ink droplet column and 50% length was measured. The measured volume was evaluated according to the following criteria.
A: Not less than 60%
B: Less than 60%

(3) Roundness

Dots printed by TM-J2100 in a print pattern in which the state of one dot can be observed was observed. Conditions for ejection were the same as those in the above item (1). Recording paper used was Oji Cash Desk 45 kg Paper (manufactured by Oji Paper Co., Ltd.). The ratio of the length of the longest part of the formed dot to the length in a direction deviated at 90 degrees from the longest part was measured. The measured value was evaluated according to the following criteria.
A: Not more than 2:1
B: More than 2:1

(4) Print Quality Upon Change in Drive Frequency

Printing was carried out by TM-J2100 at varied drive frequencies of the head in the ink ejection of 1.0 kHz, 2.0 kHz, 3.0 kHz, and 4.0 kHz. The results were evaluated according to the following criteria. Conditions for ejection were the same as those in the above item (1), and the recording paper used was Oji Cash Desk 45 kg Paper.
A: A substantially no difference in print quality was observed among varied drive frequencies.
B: A difference in print quality was observed between drive frequencies 1.0 kHz and 4.0 kHz, although no difference in print quality was observed between drive frequencies 2.0 kHz and 3.0 kHz.
C: A difference in print quality was observed among varied drive frequencies.

The results were as showing in the table below.

| | Example 1 | Example 2 | Example 3 | Example 4 (Comparative Example) | Example 5 (Comparative Example) |
|---|---|---|---|---|---|
| Evaluation (1) | A | A | A | B | B |
| Evaluation (2) | A | A | A | B | B |
| Evaluation (3) | A | A | A | B | B |
| Evaluation (4) | A | A | B | C | B |

The invention claimed is:

1. An ink composition comprising a colorant, a compound represented by formula (I):

$$CH_3-CH(CH_3)-CH_2-C(CH_3)(OH)-C{\equiv}C-C(CH_3)(OH)-CH_2-CH(CH_3)-CH_3, \quad (I)$$

a compound represented by formula (II):

$$RO-(CH_2-CH_2-O)_m-(CH(CH_3)-CH_2-O)_n-H \quad (II)$$

wherein
- R represents a straight chain alkyl group having 1 to 20 carbon atoms,
- m is an integer of 6 to 18, and
- n is an integer of 0 to 5, a pyrrolidone or its derivative, and water, the compound represented by formula (I), the compound represented by formula (II), and the pyrrolidone or its derivative being contained in a weight ratio of the compound represented by formula (I): the compound represented by formula (II): pyrrolidone or its derivative of 1:0.3 to 0.7:40 to 80.

2. The ink composition according to claim 1, wherein the pyrrolidone or its derivative is 2-pyrrolidone or N-methyl-2-pyrrolidone.

3. The ink composition according to claim 1, wherein the content of the compound represented by formula (I) is in the range of 0.05 to 1.0% by weight.

4. The ink composition according to claim 1, wherein the content of the compound represented by formula (II) is in the range of 0.02 to 0.7% by weight.

5. The ink composition according to claim 1, wherein the content of the pyrrolidone or its derivative is in the range of 2.0 to 50.0% by weight.

6. The ink composition according to claim 1, for use in an ink jet recording method.

7. An ink jet recording method comprising the steps of: ejecting droplets of an ink composition according to claim 1, and depositing the droplets onto a recording medium to perform printing.

8. A record produced by an ink jet recording method according to claim 7.

9. A process for producing an ink composition according to claim 1, the process comprising the steps of:
   providing a solution of the compound represented by formula (I) dissolved in the compound represented by formula (II); and
   adding a pyrrolidone or its derivative, water, and a colorant to the solution and mixing them together, and optionally further adding the compound represented by formula (I) thereto and mixing them together.

10. The process according to claim 9, wherein the solution of the compound represented by formula (I) dissolved in the compound represented by formula (II) contains the compound represented by formula (I) and the compound represented by formula (II) in a weight ratio of 1:1.

11. The process according to claim 9, wherein the compound represented by formula (I) added in the later stage is a solution of the compound represented by formula (I) dissolved in a polyhydric alcohol.

12. The ink composition according to claim 2, wherein the content of the compound represented by formula (I) is in the range of 0.05 to 1.0% by weight.

13. The ink composition according to claim 2, wherein the content of the compound represented by formula (II) is in the range of 0.02 to 0.7% by weight.

14. The ink composition according to claim 2, wherein the content of the pyrrolidone or its derivative is in the range of 2.0 to 50.0% by weight.

15. The process according to claim 10, wherein the compound represented by formula (I) added in the later stage is a solution of the compound represented by formula (I) dissolved in a polyhydric alcohol.

* * * * *